Dec. 18, 1928.
J. O. TEMPLETON
1,695,300
METHOD OF PASTEURIZING MILK
Filed March 13, 1925
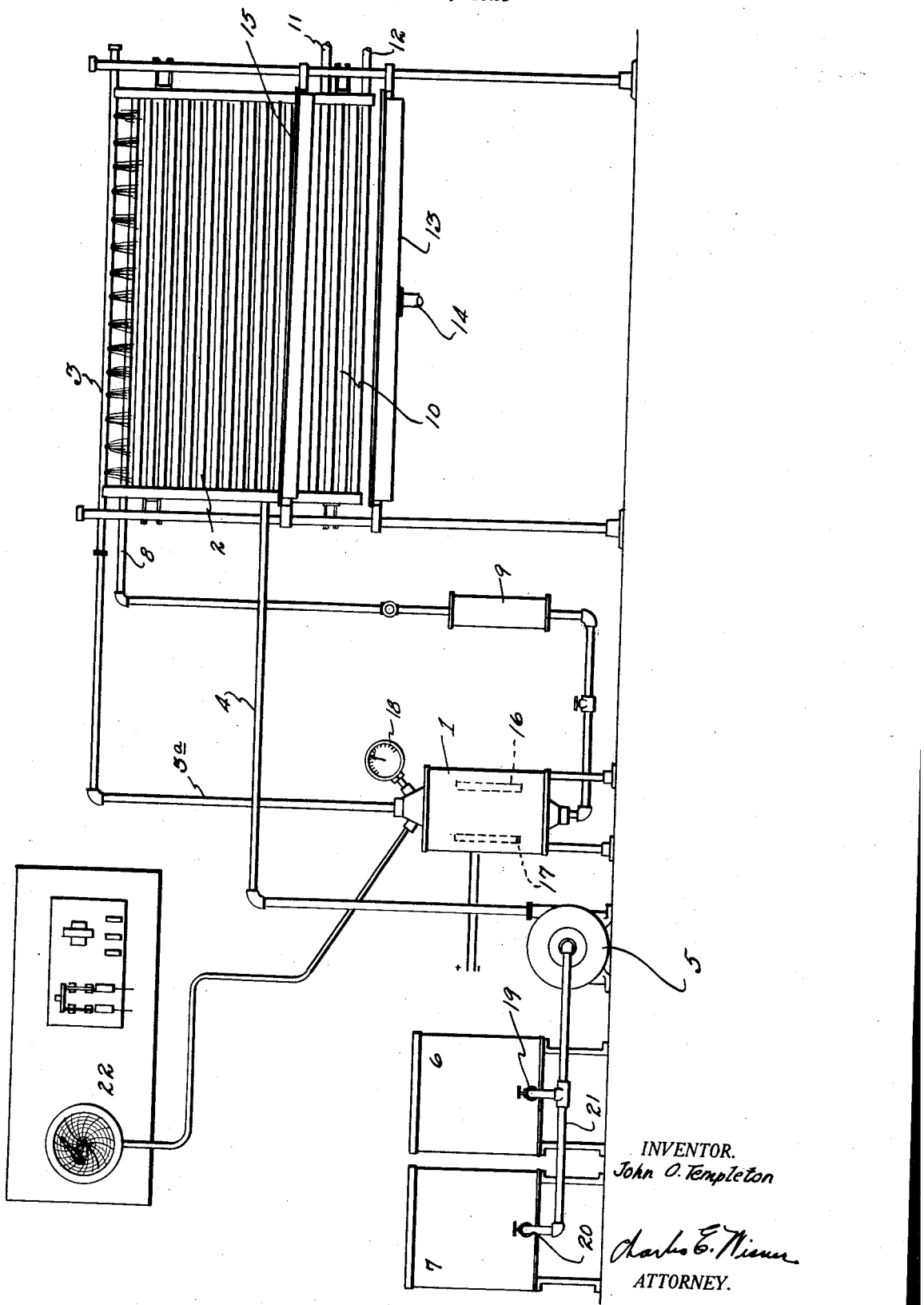
INVENTOR.
John O. Templeton
Charles E. Niemer
ATTORNEY.

Patented Dec. 18, 1928.

1,695,300

UNITED STATES PATENT OFFICE.

JOHN O. TEMPLETON, OF DETROIT, MICHIGAN, ASSIGNOR TO ELECTROPURE CORPORATION, OF DETROIT, MICHIGAN, A CORPORATION OF DELAWARE.

METHOD OF PASTEURIZING MILK.

Application filed March 13, 1925. Serial No. 15,399.

This invention relates to method of treating milk which involves the passing of an electric current through the body of the milk whereby the bacterial content is destroyed by increasing the temperature of the fluid to a predetermined temperature, the milk thereafter being cooled by passing through or over cooling coils.

The principal feature and object of the invention is in the starting of the system by passing a fluid therethrough (which includes the electro-purifier and cooling coils) that has a resistance to flow of electric current approximately equal to that of the milk or other fluid being treated. By this method of operation of the system through the passage of a liquid therethrough the electrical resistance of which is approximately equal to that of the liquid to be treated, the system is first stabilized before introduction of the liquid to be treated whereupon the liquid to be treated is introduced in continuity of flow with that of the liquid first introduced.

In apparatus and methods heretofore used in treating milk by electric current, the system is started with milk and the first milk discharged from the system has not all been properly treated and tends to seed the cooling coils. Such milk, if retained in the receptacles into which the succeeding treated milk is deposited would also contaminate the entire body of the milk treated.

A convenient apparatus by which my improved method of treating or pasteurizing milk may be performed is shown in the accompanying drawing which is an elevation of the apparatus (practically diagrammatic in form) in which the purifier or pasteurizer is indicated at 1. This purifier may be of any of the usual types in which an electric current is utilized and the milk is passed between electrodes of the circuit. The details of construction of the purifier or pasteurizer are not here shown as it is commonly known in this art.

2 indicates a series of cooling coils over which the milk after being treated is discharged by the conduit 3 leading from the purifier. These cooling coils are supplied with fluid through the conduit 4 by means of a pump 5 which may take fluid from either the tank 6 or 7 or any other means of supply. This conduit 4 leads into the bottom of the coils 2 and passes upward through the several coils to the uppermost coil 8 which leads to the filter 9 and thence to the bottom of the purifier 1. In the apparatus shown, an additional series of coils 10 are used below the coils 2 in which a refrigerant, as for instance brine from a refrigerating system, may be circulated through the tubes 11 and 12 leading to and from the coils 10. Thus, if it is desired to chill the milk it is allowed to run down over the coils 10 and into a receptacle 13 and thence through the outlet 14 to a convenient receptacle. If it is not desired to chill the milk the pan 15 is positioned between coils 2 and 10 in the cooling apparatus to receive the milk as it passes from the coils 2. This receptacle 15 may have a discharge outlet to the receptacle 13 or to other receptacles as may be found convenient. The details of construction of this cooling coil here illustrated are not important but the feature of heating the milk to be treated by the heated and treated milk passing from the purifier is useful and economical.

Milk to be properly treated should be raised in temperature to about 155 to 165 degrees F., and the electric current is supplied to a circuit (not here shown) which is broken at the two electrodes 16 and 17 indicated diagrammatically in the purifier 1, it being understood that, in the type of purifier here shown, the milk or other fluid passes upwardly between the electrodes and thus closes the circuit by providing a path for the current which heats the milk or other fluid to a predetermined temperature indicated for instance by a thermometer 18 at the upper end of the purifier. This heated fluid passes through the line 3 and over the cooling coils which are supplied with cold fluid from the tank 6 or 7 or other means of supply as is hereinafter described and thus the fluid passing to the purifier at the bottom is raised in temperature in passing through the coils 2.

Milk has certain electrical conductivity and the passing of the electric current therethrough, due to its electrical resistance, heats the milk and the flow is so regulated by valves or otherwise that movement of the milk through the pasteurizer is at the proper speed to enable it to rise to the predetermined temperature before passing into the conduit 3ª leading into the discharge line 3.

In starting a system of this character and mode of operation a considerable quantity of fluid is necessarily caused to flow through the apparatus before the proper speed of movement and other factors have been determined to produce the desired temperature change in the milk. I have therefore devised a method whereby what has been a loss heretofore or source of contamination to treated milk may be eliminated. This is accomplished by using in the tank 6 for instance a fluid having approximately the identical electrical conductivity as that of milk, and a convenient solution to use for this purpose is a salt solution of water having approximately .025 salt content. This solution tends to cleanse the various conduits and apparatus through which the milk is to pass previous to introduction of the milk thereinto and enables the operator to bring the system to its point of efficient operation and predetermined temperature and thereupon the outlet valve 19 of the salt solution tank 6 may be closed and the valve 20 of the milk receptacle 7 opened. The pump then draws the milk from the tank 7 and discharges it into the line 4 and the milk forces the saline solution from the system. By this arrangement naturally the operator can discharge the saline solution passing from the cooling system into the proper receptacle and as the milk begins to flow out of the line 3 the discharge conduit is opened to or directed into the receptacle in which it is desired to store the milk.

By this method the possibility of "seeding" the cooling system with bacteria is eliminated and possibility of contamination of the milk is also reduced to a minimum due to the cleansing effect of the salt solution used. I have only suggested the use of salt by reason of its beneficial effect, but it is to be understood that other solutions as for instance a solution of washing soda may be used with equal advantage at least so far as bringing the system to the desired temperature and condition of operation as is required for milk, the essential features being that the fluid used shall have an electrical conductivity of approximately equal to that of the milk. While not essential I have shown a temperature controlled system diagrammatically indicated at 22. This is commonly known by the trade as a control thermometer, the operation of which is well known and which may be utilized to control operation of an electric motor (not here shown but preferably directly connected with the pump 5) so that, if at any time the temperature of the milk passing through the purifier or pasteurizer 1 falls in temperature below a predetermined degree, for instance 155 degrees F., for any reason, the control thermometer will operate to break the circuit supplying current to the motor causing the pump to stop operation, and thus cease to pass milk through the purifier. The electric current is still on in the purifier and under this condition the milk has a tendency to siphon back through the system until the temperature is again raised to about the point at which the motor circuit was broken whereupon the motor again operates causing the pump to again discharge milk to the system.

In starting the system the pump is caused to operate and the valve in the supply line to the purifier 1 is so set that there is the proper rapidity of flow of fluid through the valve and up through the purifier to permit the same to acquire the predetermined temperature in passing from the purifier. Thereupon, the valve 19 to the tank 6 is closed and the valve 20 to the milk tank 7 is opened. The correct functioning of the apparatus indicated depends upon the speed of the pump and the setting of the valve at a certain point—that is, the speed of delivery of the pump which is the "head" and the frictional resistance being constant, a predetermined temperature will result in setting the valve at a certain point as will be readily understood by those familiar with the art. Therefore, in starting this system with a fluid of any desired character the electrical conductivity of which is substantially that of the milk, the valve is set by the judgment of the operator and the system operated for a period of time and the setting of the valve changed to secure the predetermined temperature of fluid passing from the purifier at which the system is to operate. If milk is to be treated, this predetermined temperature should be 155 to 165 degrees F. When this temperature of the fluid passing from the pasteurizer is attained then the flow of this fluid solution stopped and the milk or other fluid being treated is caused to flow into the system. Thus, in the treatment of milk for instance, there is no milk passing from the apparatus that is not properly treated or heated to the predetermined temperature. There is thus no possibility of "seeding" of the system, and there is no waste of the fluid being treated.

Having thus fully described my improved method of treating milk and similar fluids, what I claim and desire to secure by Letters Patent of the United States is—

1. In a method of treating milk in which the milk is to be passed between electrodes of an electric circuit to heat the same to a predetermined degree, the step consisting in passing a fluid between the said electrodes having an electrical conductivity approximately equal to that of the milk for such period of time that the fluid rises to the predetermined temperature to which the milk is to be raised as it passes from the electrode, and then introducing the milk into the system.

2. In a method of treatng milk in which the milk is caused to flow between the electrodes of an electric circuit to heat the same, the steps consisting in first passing a fluid between the electrodes having an electric conductivity approximately equal to that of the milk for such period of time that the fluid is at predetermined temperature of milk as it passes from the electrodes, and the cutting off the flow of fluid and introducing milk into the system in continuity with the fluid.

3. In a method of treating milk in which the milk is caused to flow between the electrodes of an electric circuit, the steps which consist in causing the flow of a saline solution between the electrodes consisting of pure water having a salt content of approximately .025 for such period of time that the fluid in passing from the electrodes is at the pasteurizing temperature of the milk, and then causing the milk to flow into the system in continuity with the saline solution.

4. In a method of treating milk, the steps consisting in causing fluid of an electrical conductivity approximately equal to milk to flow through a series of coils and thence to between electrodes of an electric circuit whereby the same is heated, discharging the heated fluid passing from the electrodes over the said coils through which the fluid first flows whereby the same is initially heated before passing to between the electrodes, operating the said system until the fluid in passing from the electrodes at the predetermined temperature of milk and then replacing the fluid with milk.

5. The method of pasteurizing milk in an apparatus for the purpose in which milk is caused to flow between electrodes of an electric circuit and is heated by a passage of current therethrough which consists in first operating the apparatus by a passage of liquid having the same electrical conductivity as milk therethrough and between the electrodes until the system becomes stabilized and is discharging the liquid at the desired temperature, and then stopping introduction of the said liquid and substituting milk therefor to flow into the system in continuity of flow with the first liquid remaining in the system thereby entirely discharging the said first liquid from the system and continuing operation of the apparatus with milk only.

6. The method of pasteurizing milk in apparatus in which the milk is caused to flow between electrodes of an electric circuit and heated by the passage of current therethrough, which consists in first operating the apparatus with a liquid so previously prepared as to have approximately the same electrical conductivity as milk until the apparatus becomes stabilized and the liquid is discharging at the pasteurizing temperature of milk and thereupon ejecting the treated liquid from the apparatus by introduction of the milk thereinto in continuity of flow with said liquid.

In testimony whereof, I sign this specification.

JOHN O. TEMPLETON.